United States Patent [19]

Rodgers

[11] Patent Number: 4,821,506
[45] Date of Patent: Apr. 18, 1989

[54] RADIAL TURBINE WITH VARIABLE AXIAL NOZZLE

[75] Inventor: Colin Rodgers, San Diego, Calif.

[73] Assignee: Sundstrand Corporation, Rockford, Ill.

[21] Appl. No.: 105,866

[22] Filed: Oct. 8, 1987

[51] Int. Cl.[4] .............................................. F02C 9/22
[52] U.S. Cl. ................................. 60/39.2; 60/39.25; 415/160
[58] Field of Search .................. 60/39.03, 39.2, 39.25, 60/39.36, 39.75; 415/159, 160, 161, 162, 163, 164, 165

[56] References Cited

U.S. PATENT DOCUMENTS

| | | | |
|---|---|---|---|
| 2,553,867 | 5/1951 | Parducci | 60/39.2 |
| 2,770,943 | 11/1956 | Beale | 60/39.25 |
| 3,529,419 | 9/1970 | Reed | 60/39.25 |
| 3,625,003 | 12/1971 | Liddle et al. | 60/39.25 |
| 3,899,886 | 8/1975 | Swick | 60/39.25 |
| 3,981,140 | 9/1976 | Lunsford et al. | 60/39.25 |

OTHER PUBLICATIONS

"Advanced Environmental Control System", vol. I-Aug. 1977,-Air Force Flight Dynamics Lab., Wright-Patterson AFB, OH., 45433.

Primary Examiner—Louis J. Casaregola
Attorney, Agent, or Firm—Wood, Dalton, Phillips, Mason & Rowe

[57] ABSTRACT

Thermal degradation of variable nozzle components in a gas turbine power plant is minimized by a construction including a radial outflow compressor 16 on a shaft 10 with a radial inflow turbine 18, combustion gas delivery path 78 which is generally concentric about the shaft 10, a compressed gas delivery path 40 from the compressor 16 to the turbine 18 which is parallel to the axial combustion gas path 78 and rotatably mounted guide vanes 80 located in the axial combustion path 78 which are provided with control elements 82 that extend through the compressed gas path 40 so as to be cooled by compressed gas flowing in such path 40.

11 Claims, 1 Drawing Sheet

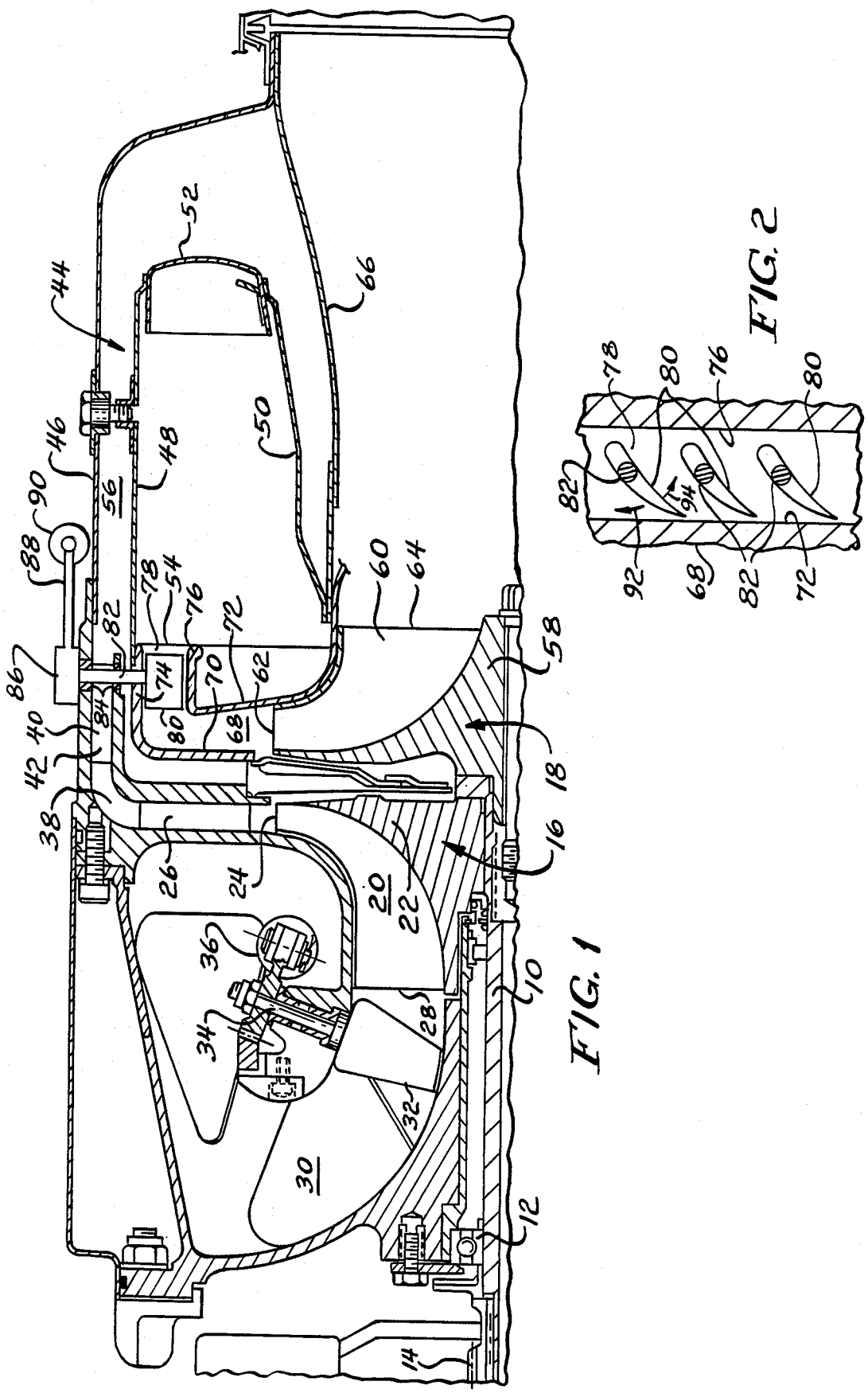

RADIAL TURBINE WITH VARIABLE AXIAL NOZZLE

FIELD OF THE INVENTION

This invention relates to turbines having a radial inflow to a turbine wheel, and more specifically, to the provision of an axially directed, variable nozzle for such a turbine.

BACKGROUND OF THE INVENTION

Auxiliary power units in the form of small gas turbines may be provided for various combinations of shaft power output and compressed air output. Typically, they are of either the so-called "integral bleed" or "load compressor" type.

Extraction of compressor discharge air in the integral bleed auxiliary power units without concurrent shaft-power output (zero concurrent shaftpower output) plus requirements to operate in a 100% shaftpower mode only (zero bleed air output), result in performance compromises necessary to maintain adequate margin against compressor surge.

Variable turbine nozzles have been used to avoid the compromises by allowing the turbine to match optimum compressor efficiencies. Heretofore, in the case of radial inflow turbines, radial turbine nozzles have been utilized. An example of this type of machine is illustrated in a report entitled,"Interim report AFFDL-TR-77-68, Volume I" for period May 1976-July 1976, obtainable from the Air Force Flight Dynamic Laboratory (FED), Wright-Patterson Air Force Base, Oh., 45433, pages 86-95 thereof dealing with variable nozzle geometry.

While such geometry is of assistance in overcoming the performance compromises mentioned above, another difficulty exists. Specifically, the components of the variable nozzles when applied to a radial inflow turbine are operating in a relatively hot environment. Both the nozzle vanes and the actuating mechanism therefore is subjected to the heat with the consequence that power plant life and reliability may be lessened.

The present invention is directed to overcoming the foregoing problems.

SUMMARY OF THE INVENTION

It is the principal object of the invention to provide a new and improved gas turbine power plant. More specifically, it is an object of the invention to provide a new and improved gas turbine power plant of the type having a radial inflow turbine with an axial flow, variable turbine nozzle.

An exemplary embodiment of the invention achieves the foregoing objects in a turbine power plant including a radial outflow compressor and a radial inflow turbine coupled for simultaneous rotation about an axis of rotation. Means are provided to deliver combustion gas from a combustor to the radial inflow turbine along an axial combustion gas path concentric to the axis of rotation along with means to deliver compressed gas from the radial outflow compressor to the combustor along a compressed gas path parallel to the axial combustion gas path.

Guide vanes are rotatably mounted and positioned in the axial combustion gas path and are provided with integral rotatable guide vane control elements that extend through the compressed gas path so as to be cooled by the passage of the compressed gas through such path.

In addition to the advantages of improved cooling along with an increase in efficiency because of the ability to improve the matching of the components, the invention has the further advantage of allowing the use of a larger diameter at the turbine rotor tip which thus provides higher efficiency. It also minimizes or eliminates the problem of nozzle erosion in radial nozzles that are commonly employed in radial inflow turbines.

The invention also contemplates that the plurality of the rotatable guide vanes be individually mounted about axes which intersect the axis of rotation of the turbine at right angles.

In a preferred embodiment, the compressed gas path is located radially outward of the combustion gas path. The invention also contemplates that the compressor and the turbine be mounted on a single shaft and positioned generally immediately adjacent to one another.

The invention contemplates that the combustion gas passage means include an axial combustion gas path section in which the vanes are disposed and which terminates in a radially inward directed combustion gas path section that focuses on the turbine.

An actuator is coupled to guide vane control elements and may be operated by suitable means to provide for position control of the guide vanes.

Other objects and advantages will become apparent from the following specification taken in connection with the accompanying drawings.

DESCRIPTION OF THE DRAWINGS

FIG. 1 is a fragmentary sectional view of a gas turbine power plant made according to the invention; and FIG. 2 is a fragmentary, enlarged, developed view of a turbine nozzle.

DESCRIPTION OF THE PREFERRED EMBODIMENT

An examplary embodiment of a gas turbine power plant made according to the invention is illustrated in the drawings and with reference to FIG. 1, is seen to include a shaft 10 journalled by bearings 12 (only one set of which is shown) for rotation about an axis. The shaft 10 may include gear teeth 14 which serve as a power take-off means.

The shaft 10 has fixedly secured thereto a radial outflow compressor, generally designated 16, and a radial inflow turbine, generally designated 18. The compressor 16 includes a plurality of blades 20 (only one of which is shown) mounted on a hub 22 which in turn is secured to the shaft 10. Each of the blades 20 has a discharge end 24 which is radially directed toward a diffuser 26 of conventional construction. Each blade 20 also includes an axially directed inflow end 28 directed toward an air inlet such as shown at 30. Inlet guide vanes 32 may be located between the inlet 30 and the vane ends 28. The vanes 32 may be conventionally rotatable about axes 34 and be driven by an actuator 36 as is well known.

Rotation of the compressor 16 will cause inlet air to be compressed and expelled from the compressor in a radial direction through the diffuser 26 which converts a velocity head to a pressure head. An annular elbow-shaped passage 38 concentric with the shaft 10 and on the outlet side of the diffuser 36 redirects the radial compressed air flow generally axially through an axial passage 40 (also concentric about the shaft 10) which typically will include deswirl blades 42 of conventional construction.

Compressed air exiting the passage 40 enters an annular combustor, generally designated 44. The combustor 44 includes an annular outer liner 46 and an annular inner liner composed of spaced walls 48 and 50 and an end wall 52. The compressed air conventionally enters the combustor 44 and is mixed with fuel therein and ignited. The hot combustion gases then exit the combustor 44 through an annular outlet 54.

It should be observed that the walls 46 and 48 are generally concentric about the rotational axis of the shaft 10 with the consequence that the two define an axial continuation of the passage 40, the continuation being designated 56.

The turbine 18 includes a hub 58 mounted to the shaft 10 by any suitable means along with a plurality of arcuate blades 60. The blades 60 have a radially outward facing inflow end 62 and a generally axially directed outflow end 64. The latter is in fluid communication with an exhaust duct 66 while the former is in fluid communication with a radially inward directed, annular throat 68 defined by spaced radial walls 70 and 72 concentric with the shaft 10.

The wall 70 includes an axial extension 74 in reasonably close radial proximity to the axial passage 40 while the wall 72 includes a radial inward, axial extension 76. The extension 74 and 76 thus define an axial passage 78 concentric with the shaft 10 and which extends from the combustor outlet 54 to the radial passage 68 to terminate at the inflow edges 62 of the turbine blades 60.

Located within the axial passage 78 is a plurality of equally angularly spaced vanes 80. The vanes 80 extend generally axially as can be seen from FIG. 2 which is a partial developed view looking radially inward on the vanes 80. The vanes 80 together with the axial extensions 74 and 76 define an axial nozzle for the combustion gases being directed against the blade 60 on the turbine wheel 18.

Each of the vanes 80 is mounted on an integral associated shaft 82 which, as seen in FIG. 1 is journalled by bearings 84 on opposite sides of the passage 40. Thus, each shaft 82 is journalled for rotation about an axis that is generally transverse (at right angles) to the axis of rotation of the shaft 10.

Radially outward of the passages 40, each shaft 82 is secured to an associated hub 86 which mounts an axially directed actuator arm or link 88. Each actuator arm 88 is connected as by any suitable means to an actuator 90. There may be one actuator for each of the vanes 80 but in a preferred embodiment, a single actuator 90 operating through a linkage or the like will be utilized for all of the vanes 80.

In any event, the angular position of the vanes 80 within the axial passage 78 can be varied in the direction of arrows 92 and 94 shown in FIG. 2 to optimally match capabilities of the compressor 16 for various operating conditions with the flow of gasses from the combustor 44 to the turbine wheel 58 to achieve optimum operating efficiencies. As noted previously, this minimizes or avoids the compromises present in fixed geometry turbines necessary to provide a desired margin against compressor surge. In addition, the invention provides advantages over radial turbine nozzles heretofore known by providing better cooling for actuator components. Note in particular that the shafts 82 extend through the passage 40 through which compressed air from the compressor 16 is flowing upstream of the combustor 44. As a consequence, the shafts 82 as well as the linkages including the hub 86, the arms 88 and the actuator 90 are all located in relatively cool regions to minimize thermal degradation of the movable components. Furthermore, because the resulting turbine nozzle is axially directed as opposed to a radially directed nozzle which conventionally would be located within the radial passage 68, the tip diameter of the turbine wheel 18 may be increased to provide a higher efficiency of operation for a gas power plant of a given overall outer diameter.

Finally, erosion problems frequently suffered in radial nozzle construction are minimized and/or avoided through use of an axial nozzle structure.

I claim:

1. A gas turbine power plant having in combination:
a radial outflow compressor means and a radial inflow turbine means coupled for simultaneous rotation about an axis of rotation;
means to deliver combustion gas from a combustor to said radial inflow turbine along an axial combustion gas path concentric to said axis of rotation;
means to deliver compressed gas from said radial outflow compressor means to said combustor along with a compressed gas path parrallel to said axial combustion gas path; and
rotatably mounted guide vane means positioned in said axial combustion gas path and having integrally secured thereto rotatable guide vane control element means extending through said compressed gas path, said guide vane control element means being cooled by passage of said compressed gas.

2. The gas turbine power plant of claim 1 wherein said rotatably mounted guide vane means includes a plurality of guide vanes and said integral guide vane control element means are mounted for rotation about an axis which intersects at right angles said axis of rotation.

3. The gas turbine power plant of claim 2 wherein said compressed gas path is located radially outward of said combustion gas path.

4. The gas turbine power plant of claim 3 wherein said radial outflow compressor and radial inflow turbine are mechanically secured to a rotatably mounted shaft and are positioned immediately adjacent one another.

5. The gas turbine power plant of claim 4 wherein said means to deliver combustion gas from a combustor include a combustion gas passage means having a first combustion gas passage portion positioned to transmit said combustion gas in said axial combustion gas path to a second combustion passage portion that transmits said combustion gases in a radial inward direction toward said axis of rotation and into said radial inflow turbine means.

6. The gas turbine power plant of claim 5 wherein said guide vane means is located in said first combustion gas passage portion.

7. The gas turbine power plant of claim 6 wherein said means to deliver said compressed gas from said radial outflow compressor means includes a compressed gas passage means having a first compressed gas passage that transmits said compressed gas in a radial outward direction away from said axis of rotation and into a second compressed gas passage portion, said second compressed gas passage portion containing said compressed gas path parallel to said axial combustion gas path within said first combustion gas passage portion of said combustion gas passage means.

8. The gas turbine power plant of claim 7 wherein said rotatable guide vane control element means passes through said compressed gas path in said second compressed gas passage portion of said compressed gas passage means.

9. The gas turbine power plant of claim 8 wherein there is included actuator means coupled to said guide vane control element means to thereby provide guide vane position control.

10. A gas turbine engine comprising:
a radial outflow compressor;
a radial inflow turbine;
shaft means coupling said compressor and said turbine for simultaneous rotation about an axis;
a combustor;
means, including a diffuser, for receiving compressed gas from said compressor and delivering said compressed gas in an axial stream to said combustor;
means located inwardly of said axial stream for receiving combustion products from said combustor and delivering the same to said turbine, and including an axially extending passage terminating in a radially inward extending passage directed peripherally about said turbine;
rotatably mounted guide vanes in said axially extending passage just upstream of said radially inward extending passage; and
means for selectively rotating said guide vanes.

11. A gas turbine engine comprising:
a radial outflow compressor;
a radial inflow turbine;
at least one shaft coupling said compressor and said turbine for simultaneous rotation about an axis;
a combustor;
means, including a diffuser, for receiving compressed gas from said compressor and delivering said compressed gas in an axial stream to said combustor;
means located inwardly of said axial stream for receiving combustion products from said combustor and delivering the same to said turbine, said combustion products receiving means including an axially extending, annular passage terminating in a radially inward extending passage directed peripherally about said turbine;
a plurality of guide vanes located in said axially extending passage and rotatable about respective axes that extend in a generally radial direction and which are located just upstream of the radially inward extending passage, each said guide vane being disposed on a respective shaft defining the associated axis, the guide vane mounting shafts extending through said axial stream; and
means coupled to said guide vane shafts at a location spaced from said guide vanes by said axial stream for selectively rotating said guide vane shafts and thereby rotating said guide vanes.

* * * * *